Figure 6:
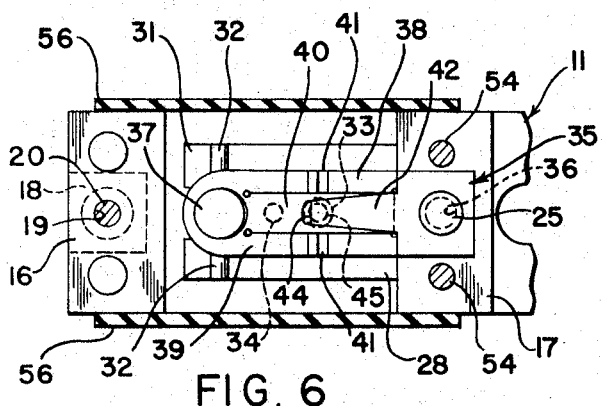

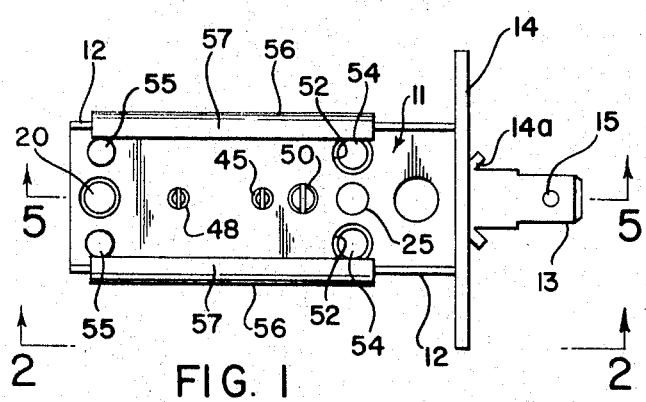
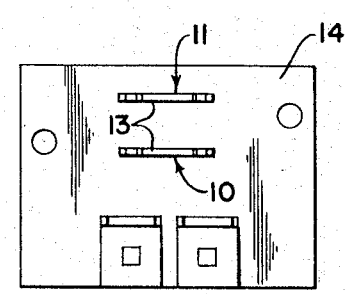
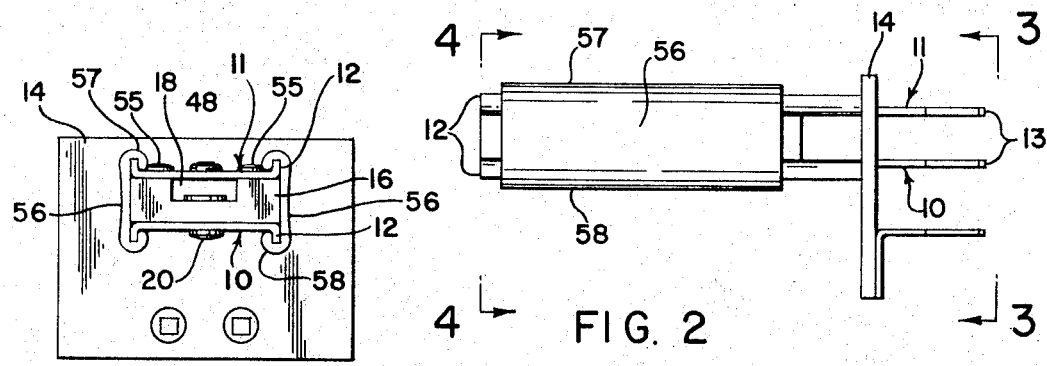
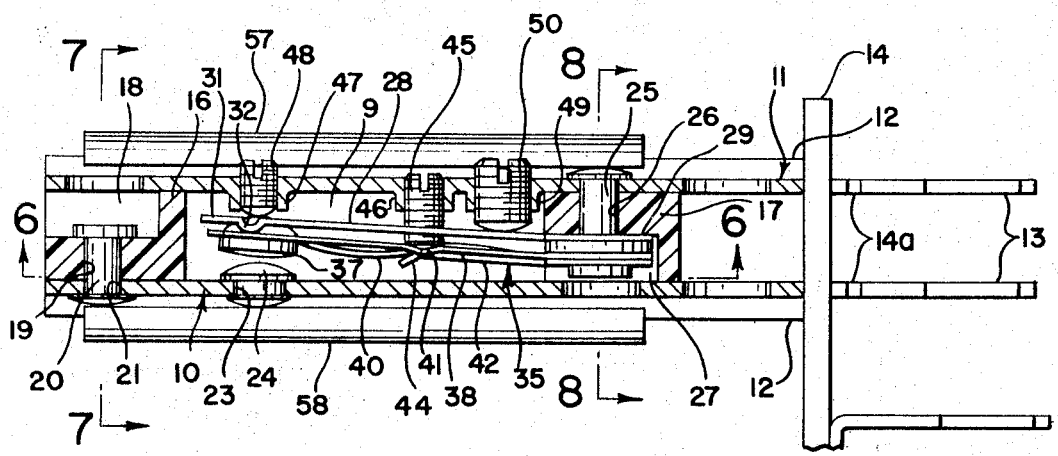

May 30, 1967  H. W. BLETZ  3,322,921
THERMAL SNAP SWITCH WITH OPERATION ON ONLY
ONE SIDE OF THE OVER-CENTER POSITION
Filed July 29, 1965  2 Sheets-Sheet 2

INVENTOR.
HOWARD W. BLETZ
BY McCoy, Greene,
Medert & Te Grotenhuis
ATTORNEYS

United States Patent Office 3,322,921
Patented May 30, 1967

3,322,921
THERMAL SNAP SWITCH WITH OPERATION ON ONLY ONE SIDE OF THE OVER-CENTER POSITION
Howard W. Bletz, Mansfield, Ohio, assignor to Therm-O-Disc, Incorporated, Mansfield, Ohio, a corporation of Ohio
Filed July 29, 1965, Ser. No. 475,805
3 Claims. (Cl. 200—138)

This invention relates to a temperature control device and more particularly to a new and improved thermostatic control of simplified construction operable within a relatively narrow temperature differential.

Heretofore, in thermostatic controls embodying over-center type snap elements made to operate in response to the movement of a bimetallic element, it was customary to connect the snap element to the bimetallic element by suitable linkage. While the snap element of such devices was constructed to snap from one side of center to the other in response to the bending force of the bimetallic element in the direction of the snap element, the linkage served to maintain the snap element in its over-center position until the pressure of the bimetal element released the snap element. In general, such prior thermostatic controls employed many types of structure to translate movement of a bimetallic element to a snap acting element controlling switch contacts.

Use of the foregoing prior thermostatic controls was limited for various reasons. For example, such controls were relatively expensive due to the multiplicity of parts employed in construction. Furthermore, the control was characterized as being operable only within wide temperature limits due partially to manufacturing tolerances of the component elements of the thermostat. When in use, lost motion between the several moving elements of the control also contributed to the wide temperature differential within which the control operated. Thus, due to their inherent construction, prior thermostatic controls were nonuniform in operation and had a tendency toward erratic performance.

Still another drawback of controls embodying translating means between the bimetallic element and the snap element was the factor of friction. The presence of any friction between the moving parts increased the amount of force which the bimetallic element was required to exert to cause the snap element to snap from one side of center to the other. This increased force could only be produced as a result of a greater temperature change. The thermostatic control was thus made additionally less sensitive to small temperature changes because of the friction associated with the relatively moving parts. Because the friction factor varied from time to time it further contributed to the erratic operation of such controls.

The present invention is directed to a new and improved thermostatic control embodying an over-center type snap element which is confined in its movement to one side of the over-center position and which is arranged to snap from the extreme over center position toward the over-center position by force exerted directly thereto by a bimetallic element bending in the direction of the snap element in response to temperature changes.

In the present invention the temperature sensing element of the thermostatic control is a cantilever mounted bimetallic element which moves toward and away from an over-center type snap element in response to temperature changes. Upon such a temperature change the bimetallic element is caused to make contact with the snap element which is disposed in the extreme position on the side of its over-center position adjacent the bimetallic element. Under influence of the temperature change the bimetallic element continues to bend in the direction of the snap element thereby increasing the force exerted upon the snap element until the same snaps to a position just short of its over-center position. Movement of the snap element frees the bimetallic element of the restraint thereon which had prevented it from bending farther toward the center position of the snap element. Thereafter, the bimetallic element follows the movement of the snap element and comes to rest thereagainst. In such position the mobile contact carried by the snap element is caused to bear against the stationary contact. With the snap element maintained under pressure by the bimetallic element near its center position, a slight reverse change in temperature causes the bimetallic element to release the force exerted by the element upon the snap member. When the snap element is free of any force exerted thereon by the bimetallic element, it returns to its original extreme position to one side of the over-center position of the snap element.

Accordingly, it is among the objects of the present invention to provide a thermostatic control device which overcomes the drawbacks and undesirable features of prior devices and is capable of controlling the flow of current to an appliance within a relatively small temperature differential.

Another object of the invention is to provide a thermostatic control device wherein lost motion between relatively movable parts of the device is substantially eliminated and which is responsive to small changes in temperature.

It is a still further object of this invention to provide a thermostatic control device wherein a bimetallic element is employed to actuate a snap element of the over-center type within a predetermined portion of a cycle of movement of the snap element.

Figure 7:
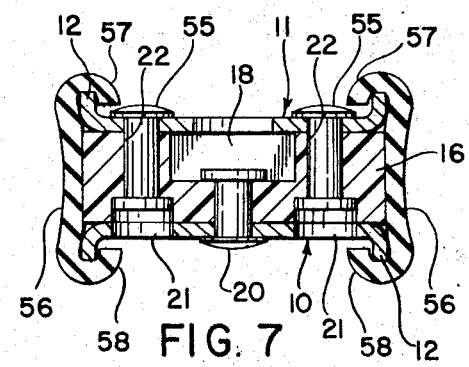
Figure 8:
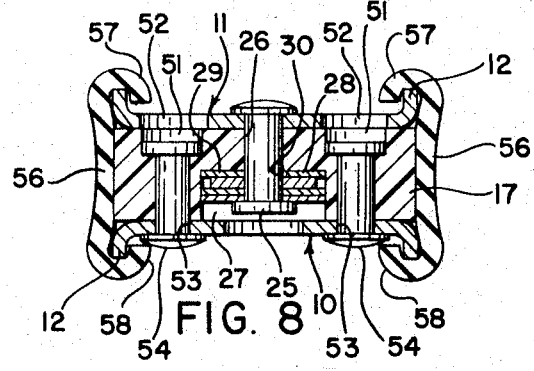
Figure 9:
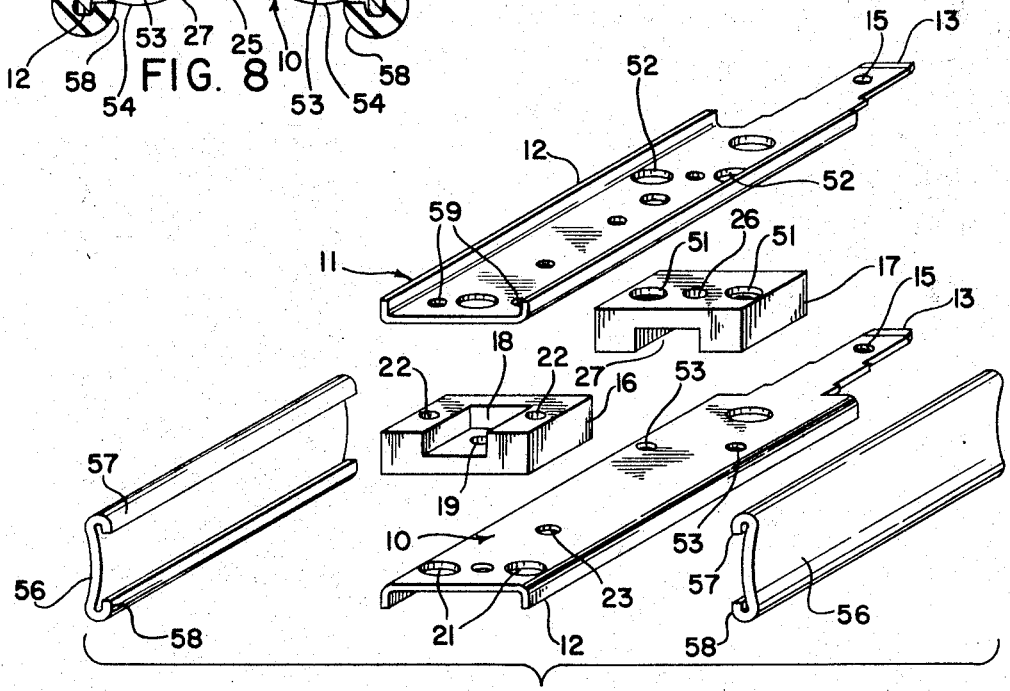

These and other objects and advantageous features of the invention will become more apparent from the following detailed description of a preferred embodiment thereof, taken in conjunction with the accompanying drawings wherein corresponding reference characters denote corresponding parts and wherein:

FIGURE 1 is a top plan view of a themostatic control embodying the present invention assembled with a mounting plate, FIGURE 2 is a side elevational view of the control and mounting plate of FIGURE 1 taken along the line 2—2 of FIGURE 1, FIGURE 3 is an end elevational view taken along the line 3—3 of FIGURE 2, FIGURE 4 is an end elevational view of the control and mounting plate of FIGURE 1 taken along the line 4—4 of FIGURE 2, FIGURE 5 is a horizontal sectional view of the control device of FIGURE 1 drawn on an enlarged scale and taken along the line 5—5 of FIGURE 1, FIGURE 6 is a longitudinal sectional view taken along the line 6—6 of FIGURE 5, FIGURE 7 is a transverse sectional view of the control and surrounding dust-proofing protectors taken along the line 7—7 of FIGURE 5, FIGURE 8 is a view similar to FIGURE 7 taken along the line 8—8 of FIGURE 5, and FIGURE 9 is an exploded perspective view of a control embodying the present invention illustrating the various elements of the control exclusive of the switch elements.

With reference to the accompanying drawings, particularly FIGURES 1 to 5, inclusive, there is illustrated a preferred form of my thermostatic control device embodying switch means for controlling an electric circuit made in accordance with the present invention and comprising spaced upper and lower substantially rectangular frame member 10 and 11 having flanges 12 formed on the longitudinal edges thereof. The flanges 12 of the frame members 10 and 11 having flanges 12 formed on directions from the respective frame members. The frame members 10 and 11 are formed of a metal capable of transmitting electric current and one end of each of the frame members has integrally formed therewith an outwardly extending terminal portion 13 preferably of stepped configuration. In the illustrated embodiment the terminal portions 13 project through a mounting plate 14 formed of any suitable insulating material and are secured thereto by peening outwardly as at 14a the end of the first offset portion thereof. The free end of the terminal portions 13 are provided with an aperture 15 to which a lead wire from a suitable source of electric current may be attached.

Disposed between the spaced frame members 10 and 11 and positioned adjacent the ends thereof are supporting blocks 16 and 17 rectangular in cross-section and coextensive with the width of the frame members. The blocks 16 and 17 are formed of a suitable insulating material and with the frame members 16 and 17 define a switch cavity 9. The supporting block 16 is formed with a centrally disposed rectangular recess 18 extending from the top surface and intersecting one longitudinal side wall and having an opening 19 extending therethrough for the reception of a rivet 20 which serves to rigidly secure the supporting block 16 to the lower frame member 10. The frame member 10 is provided with transversely spaced openings 21 formed adjacent the outer free end thereof, which openings are aligned with bores 22 extending through the supporting block 16. Midway between the longitudinal sides of the lower frame member 10 and spaced from the supporting block 16 there is formed an opening 23 which receives the shank portion of an electrical contact member 24. The portion of the shank of the member 24 projecting beyond the lower surface of the frame member 10 is riveted over to secure the contact member within the opening 23.

Secured to the lower surface of the upper frame member 11 adjacent the terminal end thereof by means of a stack rivet 25 is the terminal block 17. The stack rivet projects through an opening 26 in the block and communicates with the rectangular recess 27. Mounted on the lower end of the stack rivet 25 is a blade type bimetal member 28 having an end portion 29 of reduced width which seats within the recess 27 and is provided with an opening 30 to receive the stack rivet 25. The bimetal blade 28 projects outwardly from the spacer block 17 toward block 16 and terminates in a bifurcated end portion 31. Traversing the bifurcated end 31 is a transverse V-shaped crimp 32, the apex of which extends toward the lower frame member 10. Between the ends of the bimetal blade member 28 and midway between the lateral extent thereof is an opening 33, and spaced therefrom toward the bifurcated end 31 is a second opening 34 of lesser diameter than the opening 33. The function of the openings 33 and 34 will be referred to hereinafter. The bimetallic blade member 28 is bent along the line between the body portion thereof and the extension 29 of reduced width toward the upper frame member 11 and when mounted on the stack rivet 25 is biased toward the upper frame member 11.

Supported on the stack rivet 25 below the bimetallic member 28 is an over-center snap-acting element 35 having a circular opening 36 in one end thereof to receive the said stack rivet. The snap-acting element 35 comprises the mobile contact carrying arm of the switch unit and has mounted on the lower surface of the outer free end thereof the contact button 37 positioned to engage the fixed contact member 24 mounted on the lower frame member 10 when the switch elements are in closed circuit position.

The over-center snap-acting member 35 is best shown in FIGURE 6 and includes spaced outer strips 38 and 39 and an intermediate strip 40. The outer strips 38 and 39 are V-crimped as at 41 intermediate their ends in order to slightly shorten the overall length thereof and place the strips 38 and 39 in tension with the intermediate strip 40 in compression; hence the intermediate strip 40 will bow to one side or the other of a neutral axis.

Mounted on the stack rivet 25 contiguous to the snap-acting element 35 is a pressure spring 42 which extends along the strip 40 of the snap element and is formed at its outer end with a portion 44 arranged to exert pressure against the strip 40. Opposed to the portion 44 is the end of an adjusting screw 45 supported in a threaded boss 46 depending from the upper frame member 11. The adjusting screw 45 extends through the opening 33 of the bimetal member 28 and the outer free end thereof engages the strip 40 of the snap-acting member. Between the boss 46 and the outer free end of the upper frame member 11 there is formed another threaded boss 47 which receives an adjusting screw 48, the outer free end of which extends through the bifurcated end of the bimetal member 28 and engages the end of the snap element opposed to the mobile contact button 37 carried thereon. Another depending threaded boss 49 projects from the lower surface of the frame member 11 and receives an adjusting screw 50, the outer free end of which engages the surface of the bimetal member 28.

Transversely aligned on opposite sides of the opening 26 in the supporting block 17 are bores 51 which align with openings 52 in the upper frame member 11 and openings 53 in the lower frame member 10 when the block and frame members are in assembled relation. Suitable securing means 54 extend through the aligned openings for securing the upper frame member 11 and lower frame member 10 together with the block member 17 therebetween, and similarly at the forward end of the assembly the openings 21 of the lower frame member 10 and bores 22 in block 16 align with openings 59 in the forward end of the upper frame member 11 and receive suitable securing means 55 for securing the forward ends of the frame members 10 and 11 with the block member 16 therebetween. To protect the switch elements disposed in the switch cavity 9 defined by the spaced frame members 10 and 11 and the supporting blocks 16 and 17 disposed therebetween, there are provided dust protectors 56 coextensive with the length of the frame members and formed with reversely bent longitudinal flanges 57 which encompass the flanges of the frame members.

In the operation of the device, a change in temperature creates a change in the force within the bimetal member 28 which in turn exerts pressure on the snap-acting element 35 to effect the closing or opening of the contacts 24 and 37 of the switch assembly. It is to be noted that the force built up in the bimetal members 28 exerts a direct pressure upon the snap-acting member to overcome the spring tension in the snap-acting element 35 and effect a closing of the contacts 24 and 37. The engagement of the contacts will take place with a snap action since the spring tension in the snap-acting element 35 decreases at a faster rate than the dissipation of force in the bimetallic member 28 as the snap-acting element moves toward its over-center position. The pressure built up in the bimetallic member 28 will be considerably greater than the opposing spring tension force in the snap-acting element 35 resulting in the contact member carried by the snap-acting element being held in its engaged position against the stationary contact member 24 but short of its over-center position.

This invention affords considerable improvement over former snap-acting thermostats in that the bimetallic member does not move the over-center device beyond the over-center position. Thus, it is not necessary for the thermo-stress in the bimetallic member to build up to the point where it exerts a force sufficient to overcome the spring tension in the snap-acting element necessary to move from one side of its over-center position to the other. This allows for operation through a very narrow temperature differential. This narrow temperature differential is further enhanced by reason of the bimetallic element acting directly on the snap element rather than through linkage.

It will be understood that the above description is by way of illustration rather than limitation and that variations and modifications of the specific device shown and described may be made without departing from the spirit and scope of the invention.

I claim:

1. A temperature control device of the class described comprising longitudinally spaced parallel supporting frames, spaced electrical insulating blocks positioned between said supporting frames, said supporting frames and blocks defining a switch chamber, a stationary electrical contact on one of said supporting frames and a mobile electrical contact, both of which are mounted within the switch chamber, a cantilever mounted snap-acting element for supporting the mobile electrical contact, said mobile electrical contact being mounted upon the free end of the snap-acting element and arranged to engage the fixed contact, means for confining the movement of the snap-acting element between two predetermined points on on side of its over-center position, said snap-acting element being biased to apply force in one direction only between its limits of movement, and an elongated bimetal member cantilever mounted on one said blocks directly engaging the contact carrying end of the snap-acting element to apply pressure thereon in response to temperature change and cause the snap acting element to move from one predetermined point to the other.

2. A device as defined in claim 1 wherein said means for adjusting the bimetallic member comprises a threaded shaft rotatably mounted and arranged to engage said bimetallic member and move the same to vary the temperature limits within which the member is effective to exert force in the snap-acting element.

3. A device as defined in claim 1 wherein said means to limit the movement of said snap-acting element comprises two adjustable stops, one being mounted on one of said frame members to stop the movement of the contact-carrying end of the snap-acting element just short of its over-center position, and the other being mounted on the said one of said frame members to stop said end portion short of its unstressed position, said stops serving to maintain said snap-acting element biased in the same direction throughout its entire range of movement.

No references cited.

BERNARD A. GILHEANY, *Primary Examiner.*

H. A. LEWITTER, *Assistant Examiner.*